Jan. 3, 1967  R. D. HEFFELFINGER ETAL  3,295,664
CONVEYOR DRIVE MECHANISM
Original Filed Aug. 10, 1962  6 Sheets-Sheet 1

INVENTORS
ROBERT D. HEFFELFINGER  JOHN G. HAGERBORG
WENDELL S. THOMPSON
HENRY A. OLDENKAMP
BY F. W. Anderson
ATTORNEY

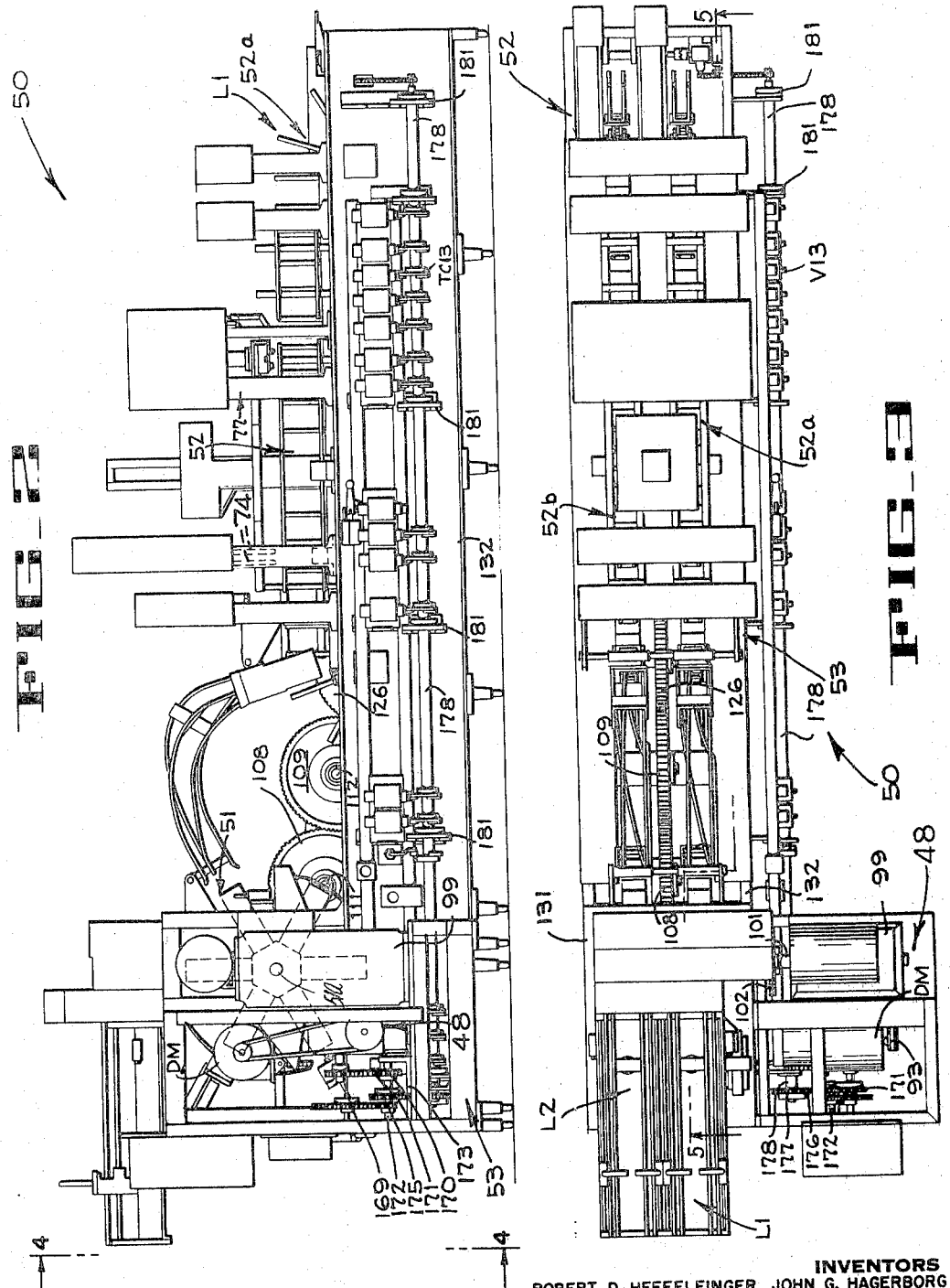

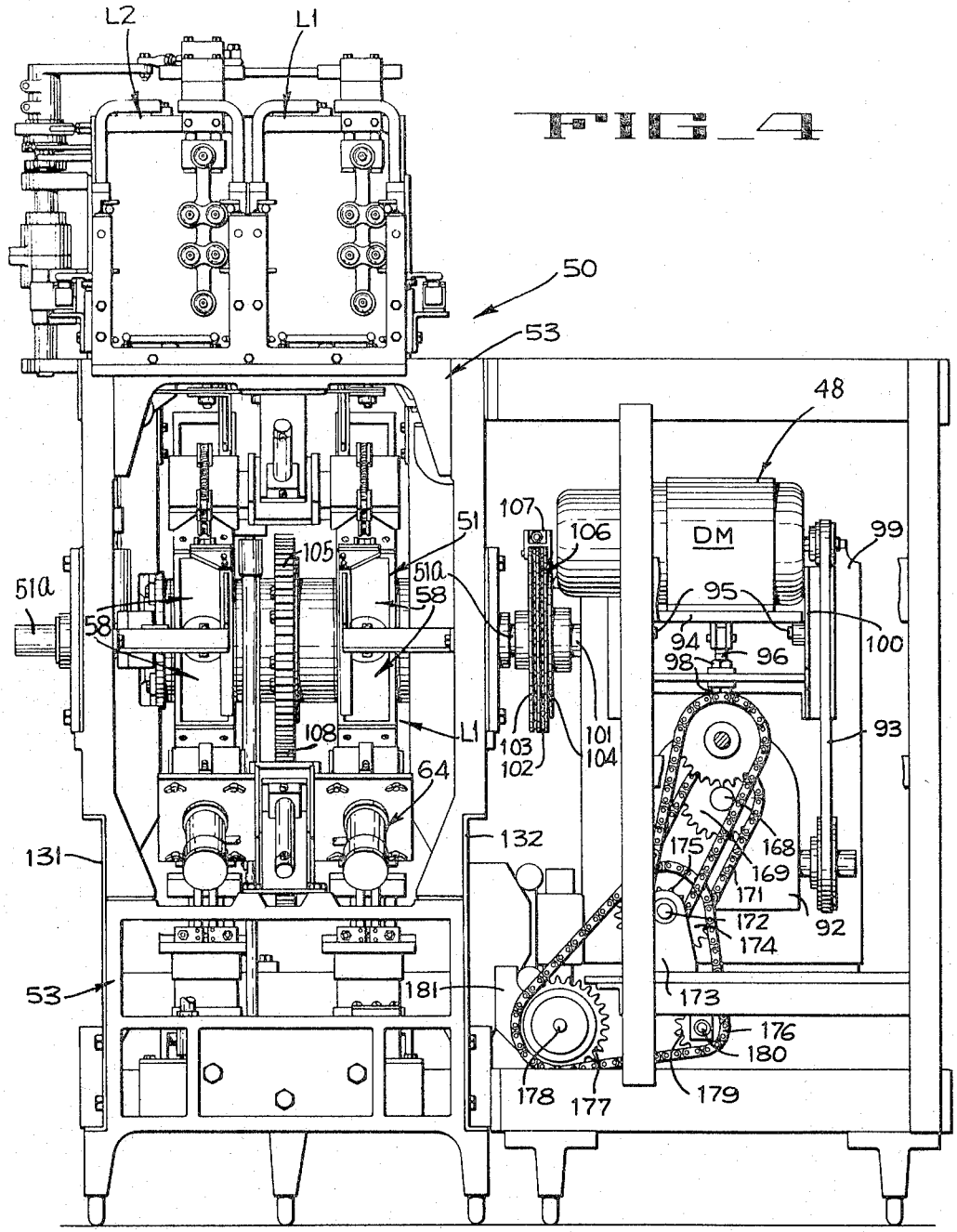

Jan. 3, 1967   R. D. HEFFELFINGER ETAL   3,295,664
CONVEYOR DRIVE MECHANISM

Original Filed Aug. 10, 1962   6 Sheets-Sheet 4

INVENTORS
ROBERT D. HEFFELFINGER  JOHN G. HAGERBORG
WENDELL S. THOMPSON
HENRY A. OLDENKAMP
BY  F. W. Anderson
ATTORNEY

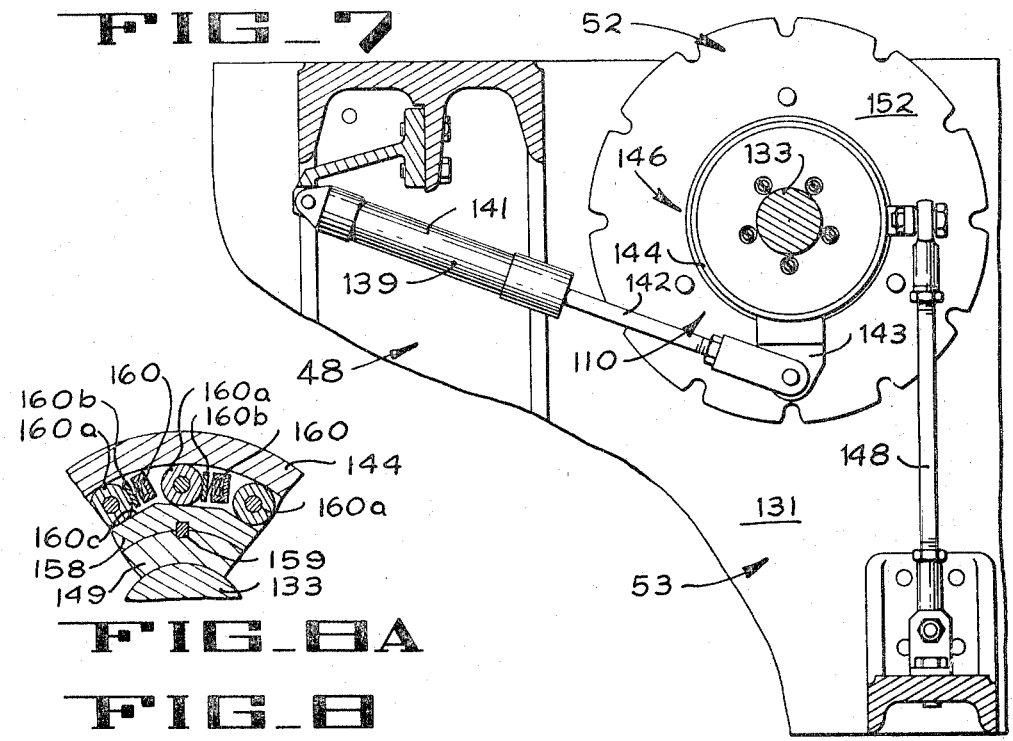

Jan. 3, 1967    R. D. HEFFELFINGER ETAL    3,295,664
CONVEYOR DRIVE MECHANISM
Original Filed Aug. 10, 1962    6 Sheets-Sheet 6
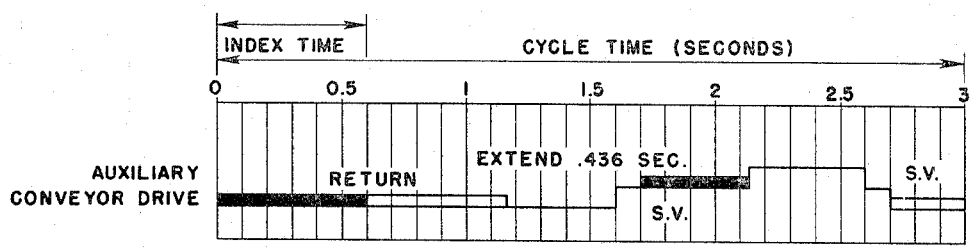
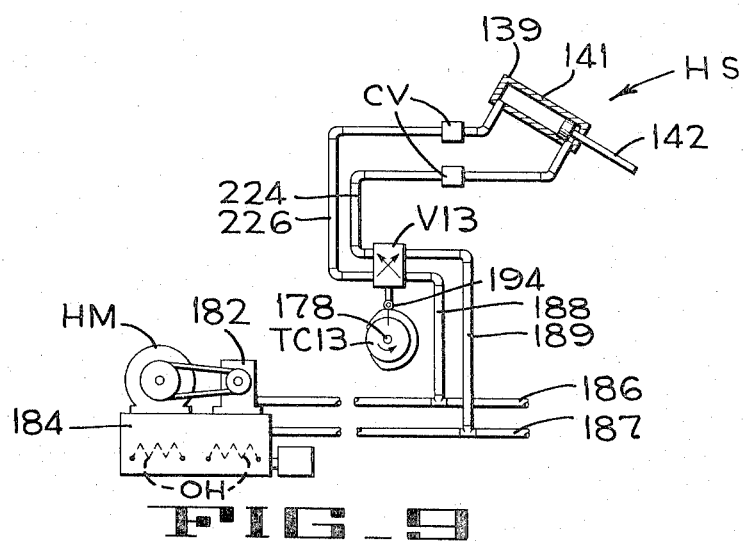
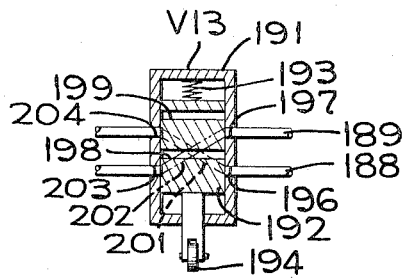
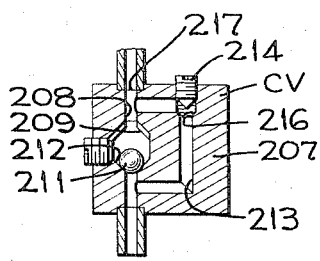
INVENTORS
ROBERT D. HEFFELFINGER  JOHN G. HAGERBORG
WENDELL S. THOMPSON
HENRY A. OLDENKAMP
BY *F. W. Anderson*
ATTORNEY United States Patent Office 3,295,664
Patented Jan. 3, 1967

3,295,664
CONVEYOR DRIVE MECHANISM
Robert D. Heffelfinger, Saratoga, Calif., John G. Hagerborg, St. Niklaas-Waas, Belgium, and Wendell S. Thompson and Henry A. Oldenkamp, Saratoga, Calif., assignors to FMC Corporation, San Jose, Calif., a corporation of Delaware
Original application Aug. 10, 1962, Ser. No. 216,248, now Patent No. 3,248,841, dated May 3, 1966. Divided and this application Feb. 11, 1966, Ser. No. 526,728
5 Claims. (Cl. 198—135)

This application is a division of our copending application Serial No. 216,248, which application was filed on August 10, 1962, and issued on May 3, 1966, as Patent No. 3,248,841.

The present invention pertains to packaging equipment and more particularly relates to a conveyor drive mechanism.

One object of the present invention is to provide an improved drive mechanism for intermittently driving a carton carrying conveyor so as to eliminate backlash and to effect a general stopping and starting of the conveyor to prevent spillage of milk.

Another object is to provide a conveyor drive mechanism for simultaneously driving the conveyor from both ends thereof.

These and other objects and advantages of the present invention will become apparent from the following description and accompanying drawings, in which:

FIGURE 2 is a diagrammatic elevation of the right side of the carton forming and filling machine, certain protective housings being removed.

FIGURE 3 is a diagrammatic plan of the machine of FIGURE 2.

FIGURE 4 is a diagrammatic front elevation of FIGURE 2 taken looking in the direction of arrows 4—4 of FIGURE 2.

FIGURE 7 is an enlarged longitudinal section taken along lines 7—7 of FIGURE 6 and illustrating an auxiliary conveyor drive unit.

FIGURE 8 is a transverse section taken along lines 8—8 of FIGURE 6.

FIGURE 8A is an enlarged section taken along lines 8A—8A of FIGURE 8.

FIGURE 9 is a diagrammatic elevation showing that portion of a hydraulic system associated with the drive mechanism.

FIGURE 10 is a central section through one of several four-way hydraulic valves used in the hydraulic system.

FIGURE 11 is a central section through one of several speed control valves in the hydraulic system.

FIGURE 12 is a chart illustrating the timing of the hydraulic unit used in that portion of the hydraulic system associated with the drive mechanism.

*General description*

Figure 1:
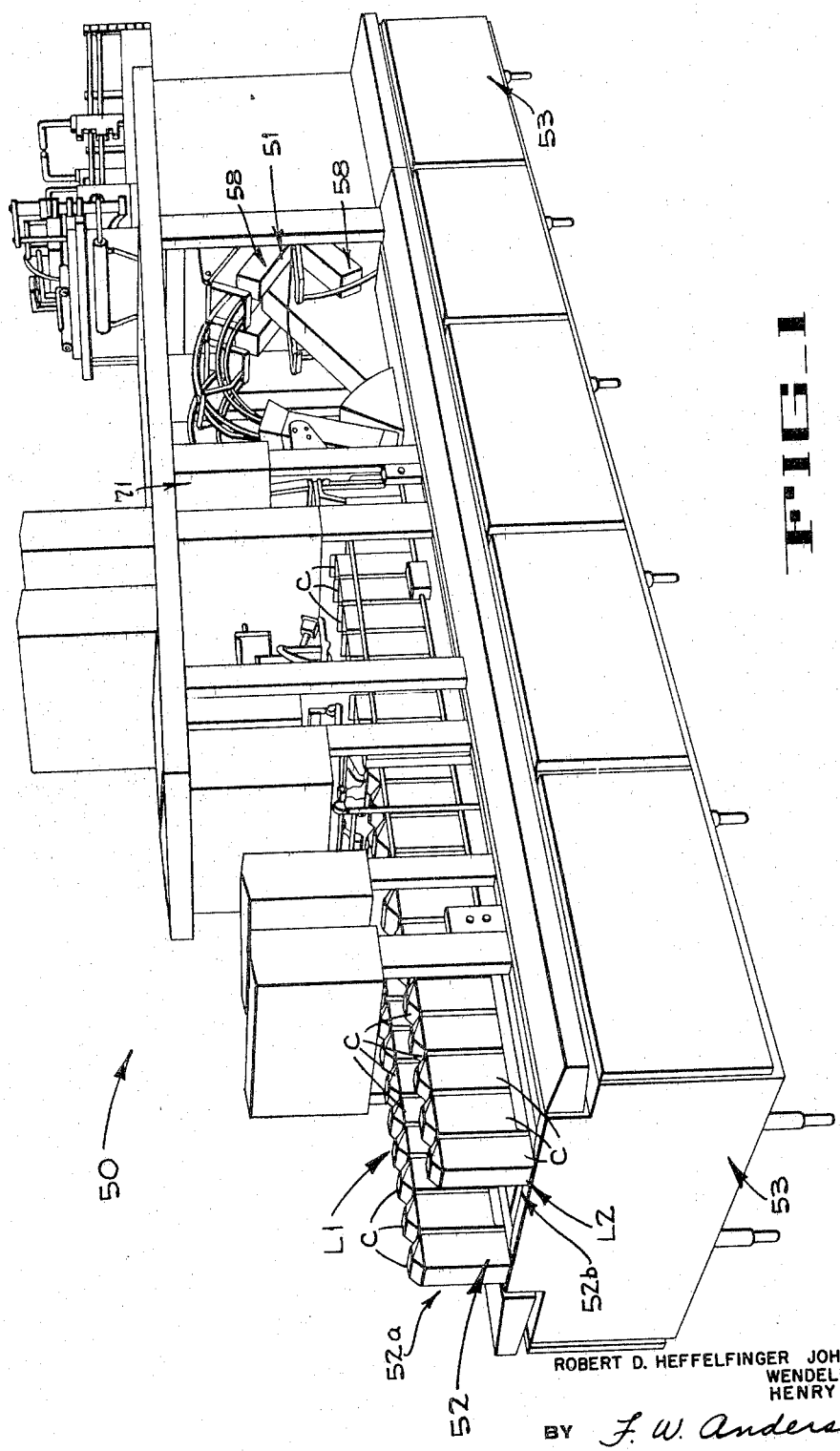
FIGURE 1 is a perspective of a carton forming and filling machine of which the conveyor drive mechanism of the present invention is a part, the view being taken looking at the elongated left side of the relatively narrow rear end of the machine.

The carton forming and filling machine 50 (FIGS. 1–4) with which the conveyor drive mechanism 48 of the present invention is associated has two main sections: a carton erecting section which is disposed at the front or left hand end of the machine (FIGS. 2 and 3) and includes several bottom forming stations, and a carton filling and closing section. In general, while moving between the several bottom forming stations, a carton is erected and placed on mandrels 58 of a turret 51 and its bottom is closed and sealed. In the carton filling and closing section, a conveyor assembly 52, which is driven by the mechanism of the present invention, is mounted on a frame 53 and includes two endless chain, carton supporting conveyors 52a and 52b (FIG. 3) which advance the cartons along the lines L1 and L2, respectively past several stations where the carton is sterilized, filled and closed.

The turret 51 and conveyors 52a and 52b are intermittently driven by the drive mechanism 48 which is timed so as to require approximately six-tenths of a second for each increment of movement and to allow each carton to remain at each station for approximately two and four-tenths seconds. As shown in FIG. 2, intermittent indexing of the turret 51 advances the cartons along an arcuate counterclockwise path past the bottom forming stations during which time operations are performed on the bottom of the cartons, and intermittent movement of the conveyor 52a and 52b advances the cartons along a linear path past the carton filling and closing section during which time operations are performed on or are associated with tops of the cartons.

Figure 6:
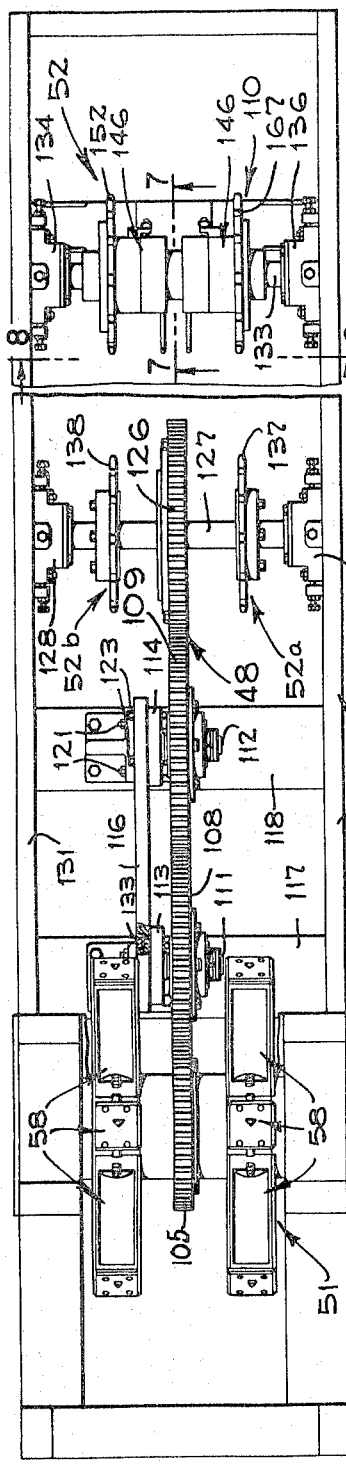
FIGURE 6 is a plan of the machine from FIGURE 5 with the carton supporting conveyors being removed to better illustrate the drive parts.
Figure 5:
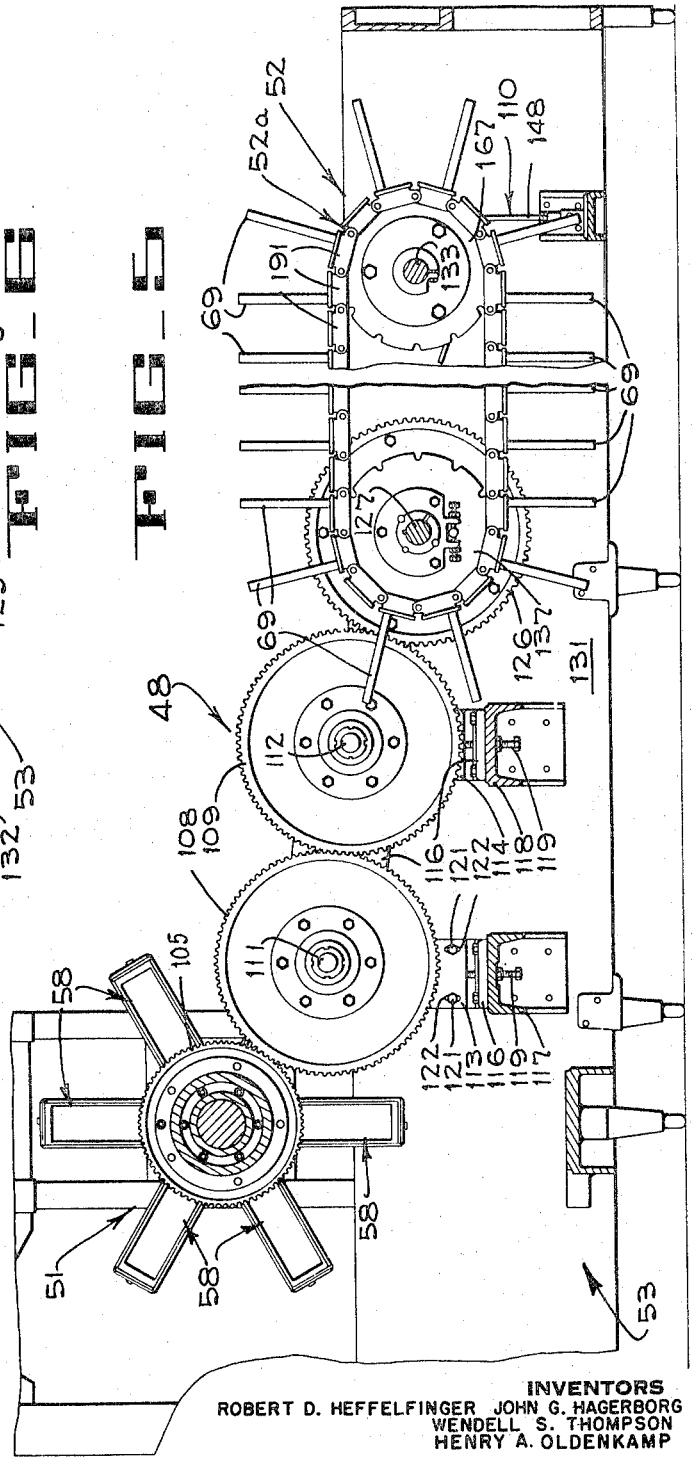
FIGURE 5 is a schematic vertical section taken along lines 5—5 of FIGURE 3 and illustrating the drive connection between the turret and the conveyor, certain parts being broken away and other parts being removed.

*Turret and conveyor drive mechanism.*—As mentioned previously, the turret 51 and conveyors 52a and 52b are driven intermittently by the drive mechanism 48 of the present invention, each movement of the turret moving a carton C from one station to the next, while each indexing movement of the conveyors advances cartons thereon only one-half the normal distance between the stations along the conveyors. The length of each indexing movement of the conveyors will be referred to hereinafter as a half-station increment. The drive mechanism 48 (FIGS. 2–8) is so timed that approximately six tenths of a second is required for each intermittent movement, and the cartons, which are disposed between drive lugs 69, remain in each station or between stations along conveyors 52a and 52b, for approximately two and one half seconds.

The drive mechanism 48 (FIGS. 2, 3 and 4) comprises a drive motor DM which is connected to a gear reducer 92 by a belt drive 93. The motor DM is mounted on a plate 94 (FIG. 4) which is pivoted at its rearward end on a pair of stubshafts 95 projecting from a fixed bracket 100, and has its forward end supported for vertical adjustment by a bolt 96 which is pivoted to the motor plate 94 and extends through a horizontal plate portion of the bracket and is locked in adjustable position by nuts 98. One output shaft (not shown) of the gear reducer 92 is coupled to a Ferguson drive 99 which drives its output shaft 101 intermittently.

The output shaft 101 is coupled to the turret shaft 51a by a coupling 102. The coupling 102 comprises identical axially aligned sprockets 103 and 104 which are keyed to the shafts 51a and 101, respectively, and have a double chain 106 trained therearound. A connector 107 is used to clamp the ends of the chain 106 together, with the chain fitted firmly around the sprockets 103 and 104.

The conveyors 52a and 52b (FIGS. 5 and 6) are accurately timed with the turret and are partially driven directly from the turret 51 by a large diameter drive gear 105 which is keyed to the shaft 51a. Also, a driving force is applied to the discharge end of the conveyors 52a and 52b by auxiliary drive units 110 to be described presently.

The gear 105 meshes with a first idler gear 108 which, in turn, meshes with a second idler gear 109. The idler gears 108 and 109 are journalled on stub shafts 111 and 112, respectively, which are welded to slide blocks 113 and 114, respectively. The slide blocks 113 and 114 are connected for vertical adjustment to a common fixed bracket 116 (FIG. 6) which is bolted to fixed transverse members 117 and 118 of the frame 53. To assure the proper meshing of the gears, the slide blocks 113 and 114 are vertically adjusted by adjustment bolts 119 (FIG. 5) which are threaded into the frame members 117 and 118 and engage the lower surfaces of the slide blocks 113 and 114. The blocks are locked in place by cap screws 121 (only two being shown in FIG. 5) which extend through slots 122 in the blocks 113 and 114 and are screwed into the fixed bracket 116, and by cap screws 123 (FIG. 6) which extend through slots (not shown) in the bracket 116 and are threaded into their respective blocks 113 or 114.

The second idler gear 109 meshes with a conveyor drive gear 126 that is keyed to a conveyer drive shaft 127. The shaft 127 (FIG. 6) is journalled in bearings 128 and 129 which are adjustably mounted on vertical side plates 131 and 132, respectively, of the frame 53 said shaft 127 having conveyor sprockets 137 and 138 keyed thereon. A driven shaft 133 is journalled in bearings 134 and 136 which are adjustably mounted on the vertical side plates 131 and 132, respectively.

The previously referred-to auxiliary drive units 110 (FIGS. 6, 7 and 8) for the conveyors 52a and 52b are associated with the driven shaft 133 and are provided to assure that the upper runs of the conveyors 52a and 52b will be taut at all times even in the event considerable wear should occur to the conveyors after long usage. Since the auxiliary drive units are substantially the same, the description of the unit which operates the conveyor 52b will suffice for both.

Each auxiliary drive unit 110 includes a hydraulic power unit 139 having a cylinder 141 (FIG. 7) pivotally connected to the frame 53 of the machine and having a piston rod 142 pivotally connected to an arm 143 that is welded to a movable housing 144 of an overrunning clutch 146 of standard well known design. A stationary housing 147 (FIG. 8) of the clutch is anchored in fixed position to the frame 53 of the machine by a link 148. A clutch spindle 149 having a flanged end wall 151, to which a conveyor sprocket 152 of the conveyor 52b is bolted, is suitably bushed and is journalled on the shaft 133. An end cap 153 is bolted to the other end of the spindle 149 and cooperates with a lip 154 on the wall 151 to support the housings 144 and 147 in end-to-end relation. The usual, well known overrunning clutch drive unit 158 is connected to the spindle 149 by key 159 and cooperates with the movable housing 144 to drive the spindle and the sprocket 152 in a clockwise direction when the housing is moved in a clockwise direction (FIG. 7) by the hydraulic power unit 139. The drive unit over runs the spindle 149 when the housing 144 is moved in the opposite direction. Similarly, a well known overrunning brake element 161 is connected by a key 162 to the spindle and cooperates with the stationary housing 147 to lock the spindle and sprocket 152 from movement in a counterclockwise direction (FIG. 7) at all times and to permit their movement in the clockwise direction. Thus whenever the power cylinder 141 is actuated in a direction to drive the sprocket 152 clockwise, the brake 161 permits such rotation, and when the power cylinder 139 tends to drive the sprocket counterclockwise, the brake prevents such rotation.

The overrunning clutch drive units 158 and the overrunning brake element 161 are identical except they are arranged to operate in opposite directions. Accordingly, a brief description of the element 158 will suffice for both.

As shown in FIGURES 8 and 8a, the clutch unit 158 includes a U-shaped inner ring 160 having apertured side walls which retain rollers 160a and cooperating resiliently-loaded flat stop members 160b therein. The bight section of the U-shaped ring has wedging surfaces 160c (FIG. 8a) formed thereon which cause the rollers to lock between the inner surface of the movable housing 144 and the associated wedging surfaces 160c when the housing is rotated in a counterclockwise direction, FIG. 8a (which corresponds to clockwise direction in FIG. 7) thereby driving the sprocket 152. When the housing 144 is moving in the opposite direction the rollers 160a are moved against the resistance of the stop members 160b, out of wedging contact between the housing 144 and the associated wedging surfaces 160c.

The spindle 149 of the drive unit 110 associated with the conveyor 52b is connected to a collar 163 that is rigidly clamped on the shaft 133 by a pin 164. Accordingly, rotation of the spindle 149 causes rotation of the shaft 133. A spacer 165 is disposed between the two auxiliary drive units 110, and a collar 166 is clamped to the shaft 133 and cooperates with the collar 163 and spacer 165 to hold the two clutches in proper spaced relation. The collar 166 is not pinned to the spindle of the drive unit 110 associated with the conveyor 52a so that the conveyor sprocket 167 bolted thereto may be moved independently of the sprocket 152.

The carton conveyor 52a (FIG. 5) is trained around the sprockets 137 and 167, and the conveyor 52b is trained around the sporckets 138 and 152. The details of the carton supporting conveyor chains 52a and 52b are fully disclosed in the parent application.

In order to accurately time the operation of the turret 51 and conveyors 52a and 52b with the operating components at the different stations, a second output shaft 168 (FIG. 4) of the gear reducer 92 has a sprocket 169 keyed thereon which is connected to a driven sprocket 170 (FIG. 2) by a chain 171. The driven sprocket 170 is keyed on an idler shaft 172 which is journalled in a bracket 173 bolted to the frame 53. A large diameter cam shaft drive sprocket 174 and a small diameter cycle timer drive sprocket 175 are keyed on the idler shaft 172. A chain 176 (FIG. 4) is trained around the large diameter sprocket 174, around a sprocket 177 keyed to a cam shaft 178, and around an idler sprocket 179 that is journalled on a shaft 180 secured to the frame 53. The cam shaft 178 extends the full length of the machine 50 (FIG. 2) and is journalled in spaced brackets 181 secured to the frame 53. A plurality of timing cams are secured at spaced intervals along the cam shaft 178 and control the actuation of the hydraulic components, to be described hereinafter, of the machine. Only the cam TC13 being used to control the conveyor drive mechanism 48 of the present invention.

*Hydraulic system.*—The hydraulic power unit 139, which operates the auxiliary drive 110 of the drive mechanism 48 of the present invention, is incorporated in a hydraulic system HS. The actuation of the hydraulic power unit 139 is timed relative to the intermittent movement of the conveyors 52a and 52b (FIGS. 2) by the timing cam TC13 (FIG. 9) which operates a four-way hydraulic valve V13. The rate of movement of the piston rod 142 of each power unit 139 is controlled during extension and retraction by at least two speed control valves CV, one valve being placed in each conduit connected to the associated power cylinder to permit free entry of hydraulic fluid into the cylinder to restrict to a predetermined rate of discharge of fluid therefrom.

As diagrammatically illustrated in FIGURE 9, the hydraulic system HS comprises a hydraulic pump 182 which is continuously driven by a motor HM. The pump 182 receives fluid from a sump 184 and discharges high pressure fluid through a manifold 186. The low pressure fluid is returned to the sump 184 from the power unit 139 through a manifold 187. Both the high pressure manifold 186 and the low pressure manifold 187 extend the full length of the machine so that the valve V13 can easily be connected thereto by high pressure conduits 188 and return conduits 189, respectively. A plurality of oil heaters OH are provided in the sump 184 and are controlled so as to maintain the temperature of the hydraulic fluid between 105 degrees F. to 140 degrees F.

As diagrammatically illustrated in FIGURE 10, the valve V13 includes a housing 191 having a shiftable core 192 therein. A spring 193 disposed between the core and the housing normally urges a cam follower 194 journalled on one end of the core against the timing cam TC13. The associated high pressure conduit 188 and return conduit 189, are connected to ports 196 and 197, respectively, in the housing 191. The port 196 communicates either with a straight line passage 198 extending centrally through the core 192, or with a slanted or cross passage 201 which extends along the periphery of the cylindrical core. Similarly, the port 197 communicates either with a straight passage 199 or with a slanted passage 202 that is formed in the periphery of the core 192 on the opposite side of the core from the peripheral passage 201. With this arrangement, the hydraulic fluid can be selectively directed through discharge ports 203 or 204 in the housing 191. It will be understood that each passage 198, 199, 201 and 202 are independent passages and do not communicate with each other.

The several speed control valves CV (FIG. 11) are identical in construction and accordingly the description of one will suffice for all. Each speed control valve CV (FIG. 11) comprises a housing 207 having a straight line passage 208 therethrough. An enlarged portion 209 of the passage 208 has a ball check valve 211 therein which rests against a seat 212 to prevent flow of fluid downwardly (FIG. 11) through the passage 208 but permits unrestricted flow upwardly (FIG. 11) through the passage 208. A U-shaped control passage 213 in the housing 207 by-passes the ball valve 211 and communicates with opposite ends of the straight line passage 208. An adjustable needle valve 214 cooperates with a frusto-conical seat 216 in the control passage to restrict the downward (FIG. 11) flow of fluid therethrough to thereby control the rate of travel of the piston 142 of the associated hydraulic power cylinder 141. It will be understood that the needle valve 214 of each speed control valve CV will be adjusted so as to achieve the desired rate of travel of the piston of the associated power cylinder. It will also be understood that the speed control valves CV are all positioned so that the upper port 217, rather than the lower port is connected to the associated power cylinder.

In regard to the chart shown in FIGURE 12, it will be understood that the darkened areas indicate the time required for the piston rods of the associated pistons to move from the extended to the retracted positions or from the retracted to the extended positions and that pressure would be applied to the same side of the piston in a dwell period after movement is completed and until the associated cam TC13 shifts the associated valve V13 to its other position. The lines marked S.V. correspond to the sloping portions of the associated cam TC13 which shifts the valve V13 between the cross-passage position and the straight passage position. The time required for the valve V13 to shift from one position to the other will not be included in the description to follow but, as shown in FIGURE 12, each shifting of the valve V13 requires approximately 0.1 second. In the description to follow, it will be understood that the term "cross-passage position" includes the position at which the passages 201 and 202 register with the conduits 188 and 189, and the term "straight passage position" indicates the position in which the passages 198 and 199 register with the conduits 188 and 189.

As indicated at the top of FIGURE 12, the conveyor and turret indexing operation takes place in the first 0.6 second of the 3 second operating cycle, and the remaining time is utilized for performing the different operations on the cartons.

The control of the hydraulic power unit 139 of the auxiliary drive mechanism 110 will now be described, having reference to FIGURES 9 and 12.

The hydraulic power units or cylinders 139 (only one being shown in FIG. 9) which operate the auxiliary conveyor drives 110 are each connected to the valve V13 by conduits 224 and 226 having speed control valves CV therein. At the beginning of the cycle, the timing cam TC13 holds the valve V13 in the cross-passage position wherein fluid is directed into the cylinder in a direction which retracts the piston rod, thereby aiding in the driving of the conveyors 52a and 52b. This amount of force applied to the piston rods 142 is controlled by the valve CV in conduit 226 and this force is applied to the piston rods 142 for approximately 1.15 seconds. Each piston rod 142 is held in its retracted positions for an additional 0.45 second. The cam TC13 then shifts the valve V13 to the straight-passage position and the speed control valve CV in the conduit 224 controls the flow rate so that each piston rod 142 is moved to its extended position in approximately 0.436 second. The piston rod 142 of each cylinder is maintained in this position for approximately 0.47 second and thereafter the cam TC13 returns the valve V13 to the cross-passage position. The valve V13 is held in this position until the end of the cycle thereby applying a force to each piston rod 142 in a direction which tends to drive the conveyor.

From the foregoing description it is apparent that the conveyor drive mechanism of the present invention is effective to simultaneously apply a driving force to both ends of the conveyor thereby maintaining the upper run thereof taut at all times assuring that the cartons supported thereby will be accurately indexed into the several processing stations associated with the conveyors. The drive mechanism is also effective to eliminate backlash in the conveyors thereby effecting a gentle starting and stopping of the conveyors so as to prevent spillage of milk.

While one embodiment of the present invention has been shown and described, it will be understood that various changes and modifications may be made without departing from the spirit of the invention or the scope of the appended claims.

The present invention and the manner is which the same is to be used having thus been described, what is claimed to be new and desired to be protected by Letters Patent is:

1. A conveyor drive mechanism for driving a conveyor having a drive shaft with a drive sprocket thereon, a driven shaft with a driven sprocket thereon, and an endless article supporting conveyor chain trained around said sprockets and having an upper run, the combination of intermittent drive means connected to said drive shaft for intermittently driving the same, means for alternately actuating and terminating actuation of said intermittent drive means, an overrunning clutch operatively connected to said driven shaft, power means connected to said overrunning clutch for activating the same, said clutch being movable into driving engagement with said driven shaft upon activating said power means, and control means operated in timed relation with said intermittent drive means for activating said power means for engaging said clutch and rotating said driven shaft immediately prior to the actuation of said intermittent drive means and for disengaging said clutch subsequent to the termination of the driving movement of the conveyor by such intermittent drive means whereby the upper run of said conveyor chain is maintained tensioned during operation of said intermittent drive means.

2. In a machine for forming, filling and closing cartons, a turret, a conveyor having a drive shaft and a driven shaft, said drive shaft being drivingly connected to said turret, intermittent drive means connected to said turret to intermittently drive the same and to drive said conveyor, an auxiliary drive mechanism for said conveyor including an overrunning clutch secured to said driven shaft, a hydraulic power unit having a piston connected to said overrunning clutch, said clutch being movable into driving engagement with said conveyor driven shaft upon actuation of said power unit, control means operated in timed relation to said intermittent drive means for actuating said power unit for engaging said clutch and driving said conveyor immediately prior to the actuation of said turret by said intermittent drive means and for disengaging said clutch subsequent to the termination of the driving movement of said conveyor by said intermittent drive means whereby the upper run of said conveyor is maintained tensioned during operation of said drive means, and an overrunning brake on said driven shaft arranged to prevent rotation of said shaft in a reverse direction when the pressure applied by said power unit is discontinued.

3. A conveyor drive mechanism according to claim 1 and additionally including an overrunning brake operatively connected to said driven shaft and arranged to prevent rotation of said shaft in a reverse direction when the pressure applied by said power means is discontinued.

4. A conveyor drive mechanism according to claim 1 wherein said power means is a hydraulic power unit.

5. A conveyor drive mechanism according to claim 2 wherein such intermittent driving means includes a continuously driven shaft, and wherein said control means includes a cam shaft, means connecting said continuously driven shaft to said cam shaft for driving said cam shaft one revolution for each intermittent movement of said drive shaft, a cam secured to said cam shaft, a four-way valve disposed in position to be actuated by said cam and communicating with said power unit for changing the direction of flow of hydraulic fluid into said power unit whereby said power unit engages and disengages said clutch once for each intermittent movement of said intermittent drive means.

No references cited.

EVON C. BLUNK, *Primary Examiner.*

R. E. AEGERTER, *Assistant Examiner.*